Aug. 2, 1966     E. O. WILLIAMS, JR., ET AL     3,263,832
AIRCRAFT CARGO LOADING SYSTEM

Filed April 20, 1964     13 Sheets-Sheet 2

INVENTORS
ELWYN O. WILLIAMS, JR.
DONALD M. INGHRAM

BY Hans G. Hoffmeister
ATTORNEY

Aug. 2, 1966   E. O. WILLIAMS, JR., ETAL   3,263,832
AIRCRAFT CARGO LOADING SYSTEM
Filed April 20, 1964   13 Sheets-Sheet 5

INVENTORS
ELWYN O. WILLIAMS, JR.
DONALD M. INGHRAM
BY Hans G. Hoffmeister
ATTORNEY Aug. 2, 1966  E. O. WILLIAMS, JR., ETAL  3,263,832
AIRCRAFT CARGO LOADING SYSTEM
Filed April 20, 1964  13 Sheets-Sheet 12

INVENTORS
ELWYN O. WILLIAMS, JR.
DONALD M. INGHRAM
BY Hans G. Hoffmeister
ATTORNEY

3,263,832
AIRCRAFT CARGO LOADING SYSTEM
Elwyn O. Williams, Jr., and Donald M. Inghram, both of Santa Clara, Calif., assignors to FMC Corporation, San Jose, Calif., a corporation of California
Filed Apr. 20, 1964, Ser. No. 360,892
19 Claims. (Cl. 214—38)

This invention relates to the art of material handling in general, and more particularly to a system for the loading and unloading of cargo aircraft. In order that the invention may be better understood, brief reference will be made to the problems currently encountered in the loading of cargo airplanes.

A fleet of large jet cargo airplanes is now in service. These planes have a longitudinal cargo deck extending along a substantial portion of the fuselage, at about the vertical midsection of the fuselage. One such plane can be loaded with 13 pallets, and will carry a payload of 45 tons. Twelve of these pallets have a dimension laterally of the plane of 125", and a dimension longitudinally of the plane of 88", and some of these larger pallets may, when loaded, weigh as much as 10,000 pounds. There is one smaller pallet in the tail section.

The usual cargo stowage arrangement in the plane to be described is for the pallets to be designated as follows: the No. 1 pallet is to be stowed forward of the loading door, the door being just forward of the main wing. The first pallet to be loaded in the tail section is pallet No. 13, which is the smaller pallet referred to, and which fits in the tail section of the fuselage. Pallets Nos. 12–3 inclusive, are next stowed in the fuselage in the order named, aft of the loading door. The last pallet to be loaded is pallet No. 2, which is stowed at the loading door.

The proper loading of 13 pallets of the type described into a given airplane requires consideration of two factors. First, the designated group of pallets must each be weighted, and a loading pattern established which properly distributes the weight of the cargo along the length of the airplane fuselage. Secondly, and insofar as consistency with the load distribution requirement within the aircraft is possible, the pallets should be loaded into the airplane fuselage with consideration given to their destination. When more than one stop is to be made by the airplane, it is highly desirable that the pallets 3–13 be loaded into the fuselage of the plane on a first in, last out basis (FILO). These considerations require additional planning, other than the weighing of the pallets. A loading pattern must be established which is not only suitable for safe operation of the airplane, but which is also compatible with the above mentioned FILO destination requirements. When these factors have all been considered, a loading pattern is determined, and numbers such as Nos. 1–13 can be assigned to each of the pallets destined for a given cargo aircraft.

The carrying out of the above procedure is rendered difficult by the fact that the final assignment of each pallet to a given airplane is generally transmitted to the terminal crew only about 30 minutes before the plane is due to depart, ready for loading. This means that during these 30 minutes, each of the loaded pallets must be weighed, and the loading plan determined, taking into consideration of balance of the plane as described above, with consideration being given to loading the pallets on a FILO basis.

It has been found in practice, that under these conditions of operation, once the pallets are weighed and the loading plan established, there is no time left in the allotted period of 30 minutes to re-position the pallets into orderly rows for sequential pick-up. The pallets can only be placed where it is most convenient to place them after each of them is weighed. Thereafter, during the actual loading operation, it is necessary that the pallets be picked-up and loaded into the plane at random. It is possible that any pallet, at any location, either in the cargo portion within the terminal building or out on the loading dock, be the pallet designated for the first, third, or any other position in the cargo space of the aircraft.

In addition to the problems referred to above, the rapid and continuous loading of the plane, itself, presents a physical problem. First of all, during the loading process (and this also applies to the unloading process) the vertical height of the plane cargo deck gradually changes, due to progressive change in weight of the cargo. Also, the plane fuselage tends to pitch and yaw at times, due to the action of gusts of wind. Thus it is necessary that the loading apparatus be capable of accommodating itself to the various airplane motions of this type.

In addition to the type of accommodation just described, if anything other than a purely portable (i.e., lift trucks) loading apparatus is employed, (such as the semi-fixed loading assembly employed in the system of the present invention), it is necessary that the loading assembly be positionable to accommodate for slight variations in the pilot's setting down of the plane at the loading dock.

There is still another consideration. It is highly desirable from a standpoint of orderly loading, lack of confusion, and economy, to make possible the rapid loading of indiscriminately positioned pallets as described above, while requiring a minimum size terminal crew. The system of the present invention takes all of these factors into consideration, and, as will be seen, deals with them in a simple, effective and efficient manner, under control of a single operator for selection of pallets and controlling the power driven features of the system. There are usually two aircraft loaders at the aircraft door, but they need not be experienced in operating all of the mechanical equipment.

Briefly, the loading system of the present invention includes four basic units. There is a semi-fixed (partially traveling) loading assembly having an elevatable platform which can be aligned with the sill of the cargo door of the plane, and which has a reversible power conveyor. There is also a travelling loading unit for the loading assembly, which is a pallet transporter movable along the terminal floor, and provided with an elevatable power conveyor platform. There are a number of unpowered pallet dollies for storing pallets individually; and a number of two-tier staging units with power conveyors for storing pallets, under cover, if desired. The transporter receives pallets from the dollies and staging units and delivers them to the loading assembly. The latter passes them on to the plane.

It is an object of the present invention to make possible the rapid loading of aircraft with pallets which are randomly or indiscriminately placed both in and outside of the terminal building.

Another object is to permit the pre-positioning of loaded pallets in tiers or stages, in a manner in which a pallet in any tier can be individually removed from the stage and loaded onto the plane.

A further object of the invention is to make possible the unloading of pallets from dollies, for loading the plane as well as the loading of dollies with pallets unloaded from a plane.

Another object is to facilitate handling the pallets of the type described for plane-to-plane transfer, as well as simply unloading the plane for storing of the pallets in the terminal.

Still another object of the present invention is to provide for one man control of substantially the entire power loading operation from a dolly, or from a pallet storage or staging unit, and on to the loading assembly for final transfer to the sill of the cargo door of the plane. This operator is stationed on the transporter that receives pallets from the dollies or staging units, delivers them to the aircraft loading assembly, and can control the loading assembly himself.

A further object of the present invention is to provide means for protecting a man, or men, at the sill of the plane cargo door, against injury by pallets being power advanced under control of the principle operator who is running the transporter and the loading assembly of the present invention.

Another object is to insure that pallets will not be inadvertently run off of the apparatus from an elevated position.

Another object of the invention is to provide a loading assembly which will accommodate pitching and yawing of the plane during loading, so that loading can be conducted continuously without interruption, due to wind conditions, or the like.

It is an object of the present invention to provide a loading assembly which will accommodate itself to slight longitudinal variations in the positioning of the plane by the pilot, in setting the plane down for loading.

Another object of the present invention is to provide a two tier storage or staging unit, which is power operated, and can be controlled by the operator of a transporter unit embodying the invention.

The manner in which these and other objects may be obtained by the loading system of the present invention will be apparent to those skilled in the art from the following detailed description of the invention, taken in conjunction with the accompanying drawings:

In the drawings:

FIGURE 8 is a plan of the loading assembly, with the extendable bridge retracted.

*General description*

Figure 1:
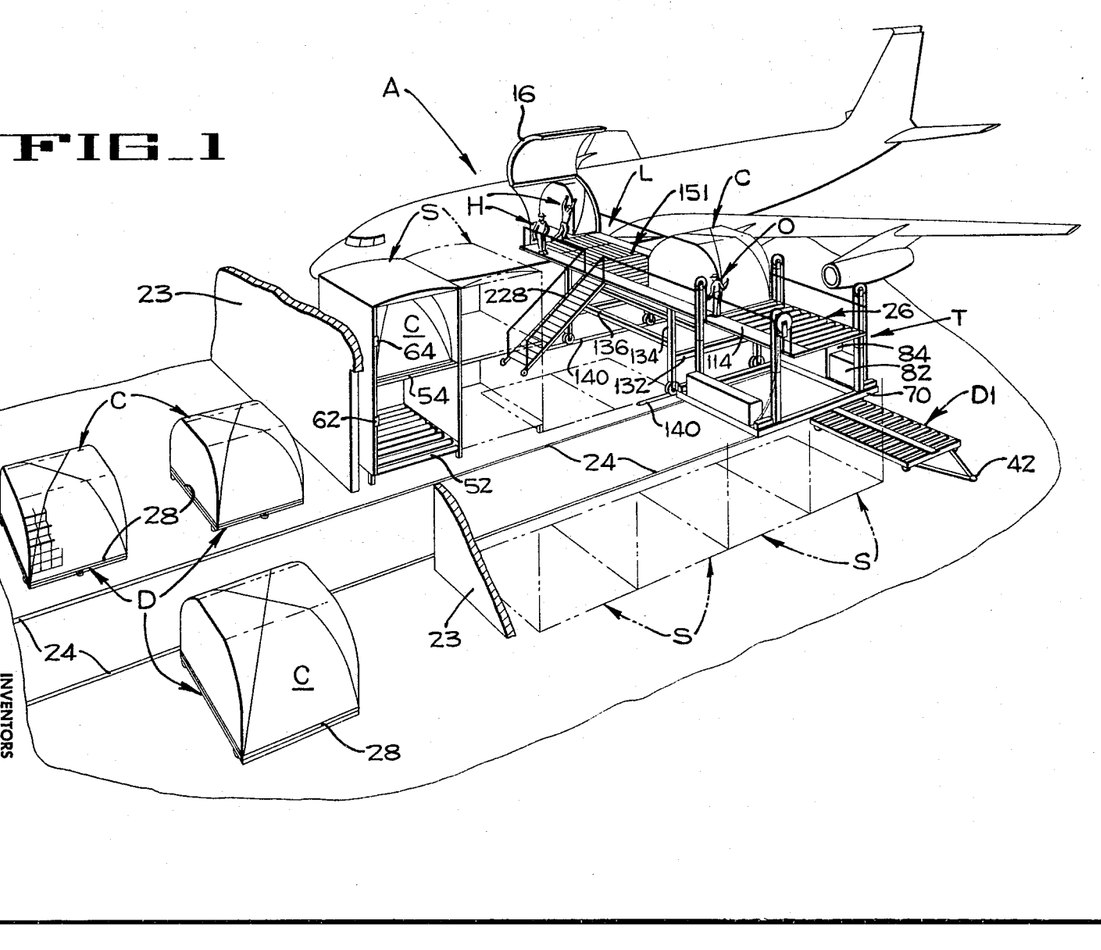
FIGURE 1 is a perspective of an aircraft loading system embodying the present invention.
Figure 2:
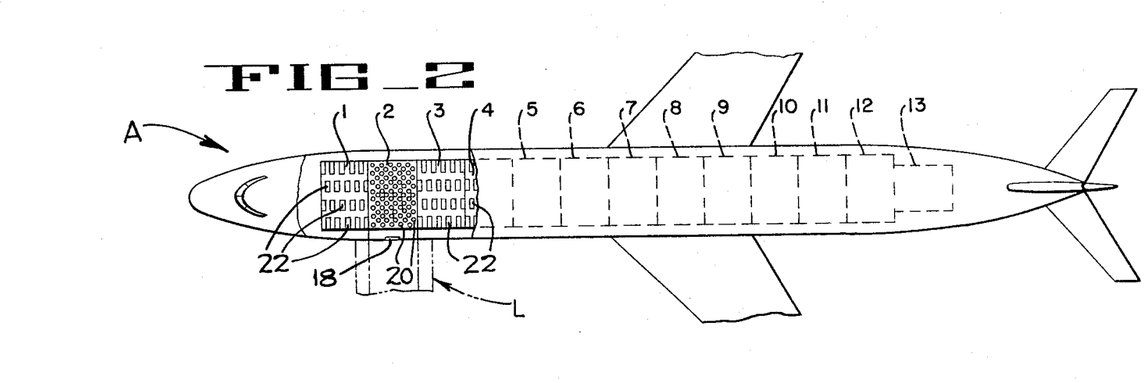
FIGURE 2 is a diagram of the loading plan of a typical aircraft to be loaded by the system of the invention.

The over-all system embodying the present invention, and the type of aircraft which the system is adapted to load and unload, is shown in FIGURES 1 and 2. The cargo aircraft A has a cargo deck with a door 16 (FIG. 1), below the door of sill 18, which enters into the loading operation. The cargo deck of the aircraft A being described, is provided with thirteen cargo storage areas or zones indicated by the numbers 1 to 13 in FIG. 2. The loading zone 2, which is at the door 16 and the doorsill 18, is provided with a plurality of rotatable balls 20 to accommodate pallet motion in any direction. These balls are spring-loaded in a manner which forms no part of the present invention, so that a few balls will be depressed by a man's foot to give him a footing inside the door 16, whereas the total force exerted on all of the balls by their springs is sufficient to support a palleted cargo having a weight in the order of 5 tons. The loading areas or zones 1, and 3–13, are provided with rollers 22, which accommodate fore and aft motion of a palleted cargo after the same has been introduced into the loading zone 2 at the cargo door 16.

In FIG. 1, the aircraft A is shown in a terminal ready for loading or unloading by the system of the present invention. The terminal includes a wall 23 which separates the storage area thereof from the runways and landing area. A pair of tracks 24 run from the interior to the exterior of the terminal, for mounting a traveling loader or transporter T, having an elevatable platform 26. The platform 26 is actually an elevatable power conveyor for handling palleted cargos, such as cargo assemblies C, which may weigh up to 5 tons as previously described. The cargo making up each cargo assembly C is actually stacked on flexible aircraft type pallets 28, the details of which are not part of the present invention.

The cargo assemblies can be loaded on and unloaded from a plurality of dollies D and D1. The dollies D are disposed within the terminal, whereas the dollies D1 are disposed without the terminal, and can be hitched to a tractor, and hitched together.

Without the terminal wall 23, is arranged a plurality of staging units S, which are two tiered storage units having powered roller conveyors. If the staging units S are outside of the terminal, they may be covered to protect the cargo assemblies C which they carry. At the aircraft A, is a loading assembly L which receives cargo units from the transporter T, and directs them to the loading door of the aircraft. As will be seen, in operation the transporter T receives cargo assemblies C from either the dollies D or the staging units S, and thereupon the transporter T moves along the tracks 24 until it is aligned with the loading assembly L. Here the cargo assemblies C are transferred onto the loading assembly L, and hence into the plane. The dollies D1 may also be employed in the process if desired, and of course it can be reserved for unloading a plane.

*Dollies*

Figure 3:
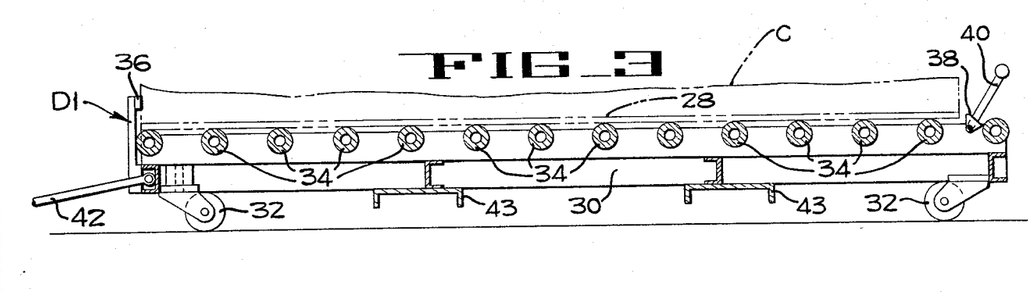
FIGURE 3 is a longitudinal section of one type dolly.

An exterior type dolly D1 is shown in FIG. 3. The dolly has a frame 30 with caster wheels 32 at each corner thereof. The frame mounts a set of non-powered conveyor rollers 34, and is provided with a removable stop 36 at the front or towbar end of the dolly. A pivoted retractable stop 38 is mounted at the rear or unloading and loading end of the dolly, which stop can be manually retracted by an operating arm 40. A tractor hitch towbar 42 is pivotally mounted at the front end of the dolly and this represents the principal difference between the exterior dollies D1 and the interior dollies, D which do not require a tractor towbar hitch because they are pushed around manually inside the terminal. The dollies D and D1 are provided with lift truck fork channels 43 (FIG. 3).

Staging units

Figure 4:
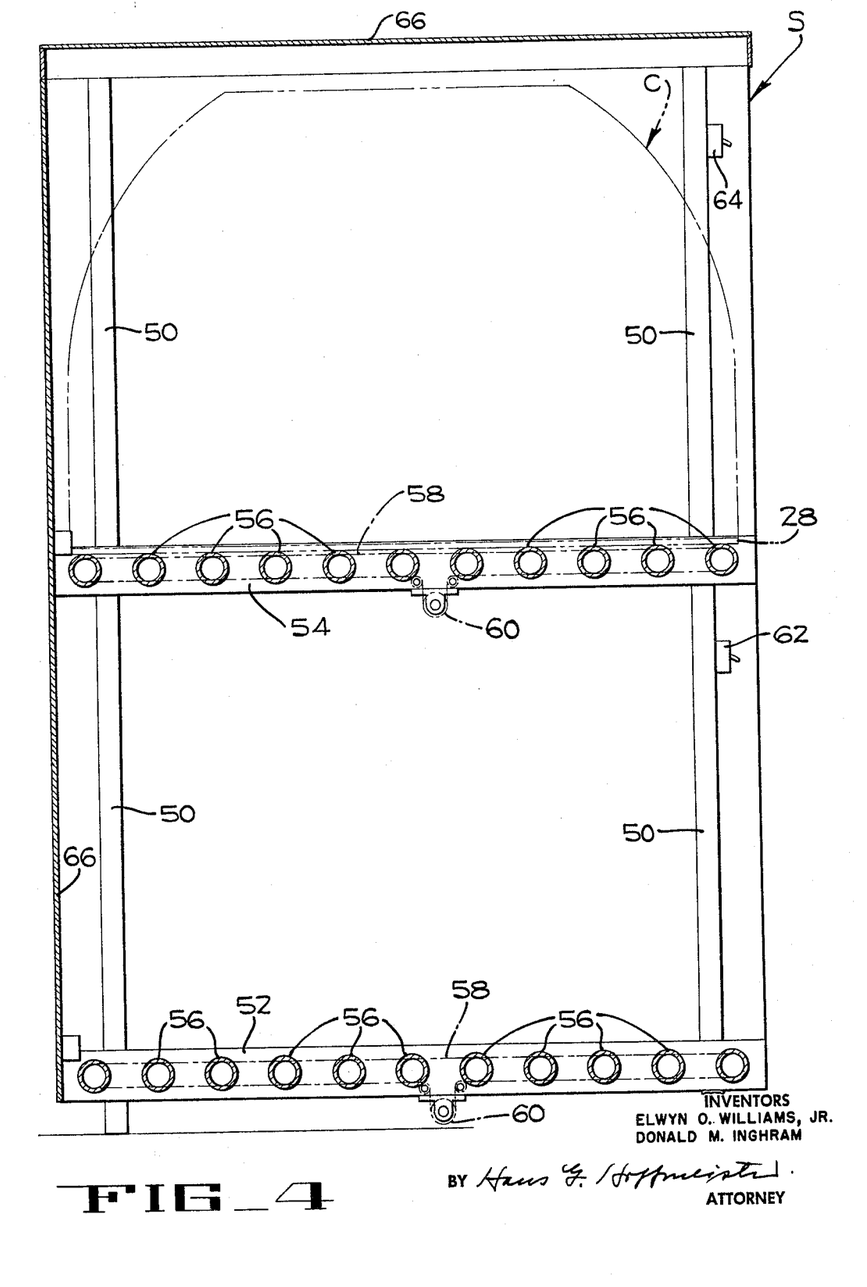
FIGURE 4 is a vertical section of a staging unit.

The staging units are best seen in FIG. 4, although they are illustrated somewhat diagrammatically in FIG 1. Each staging unit S has four corner frame posts 50, which rest on the floor and which are connected to a lower platform 52 and an upper platform 54. Each platform has a plurality of power driven rollers 56, which carry sprockets (not shown) driven by a chain 58 and an electric motor 60, which is reversible. The rollers on the lower platform 52 are controlled by a reversing switch 62 accessible by the principal operator standing on the platform 26 of the transporter T. A similar switch 64 controls the rollers of the upper platform 54. As shown in FIG. 4, a weather shield or cover 66 can be provided over the top and rear side of the staging unit S.

Transporter

The traveling loader or transporter T is shown in FIGS. 1 and 5–7, 7A and 7B. The transporter has a lower frame 70, which mounts driving wheels 72 that are flanged for running on the tracks 24. The driving wheels 72 are connected by an axle 74 that is driven by a hydraulic motor 76, through a gear reduction unit 78, the details of these elements forming no part of the present invention. A pair of wheels 79 (FIG. 5) is mounted on an axle at the other end of the transporter. The remotely controlled brake indicated diagrammatically at 80 (FIG. 5) is provided for the transporter, the details of this brake not being critical to the present invention.

The transporter T is self-powered by an internal combustion engine 82, which drives pumps in a housing 84, for providing a controllable source of pressurized hydraulic fluid, the details of the engine and the pumps are not important to the invention these being standard industrial items. A control valve operated by handle 86 is connected between the driving pump and the driving motor 76 is provided at the platform 26 for operating the transporter T in forward or reverse.

Figure 7:
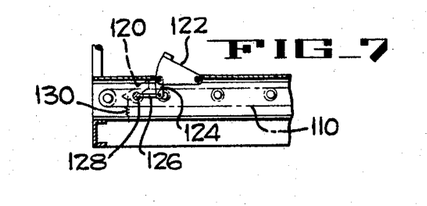
FIGURE 7 is a diagram showing one of the pedal operated, self clearing stops for the transporter.
Figure 7A:
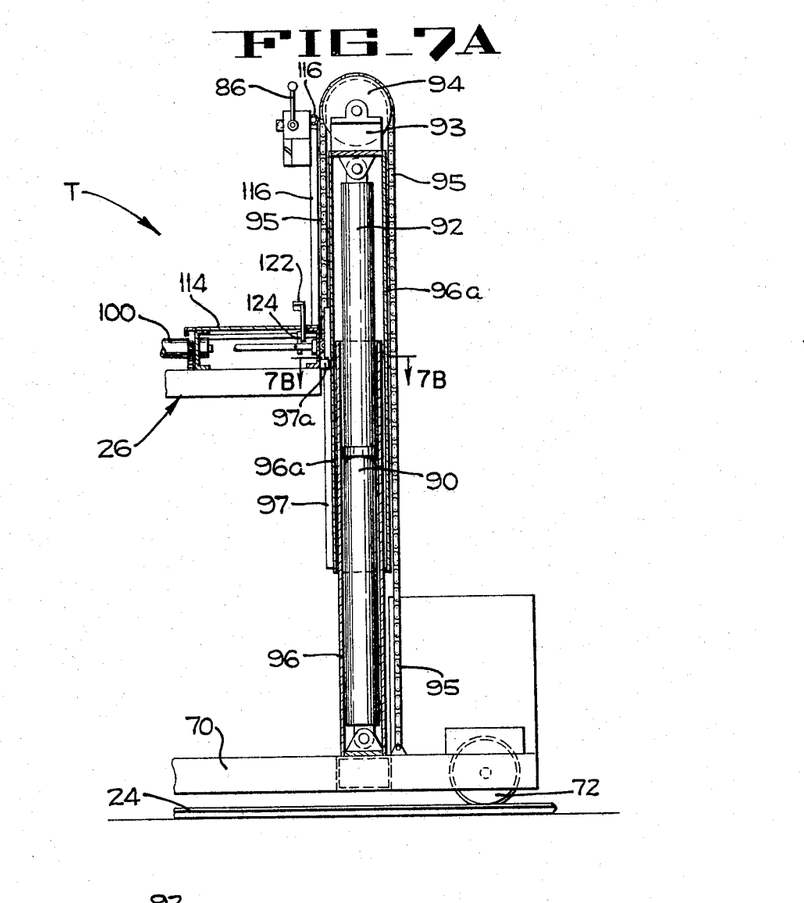
FIGURE 7A is fragmentary vertical section of one elevator lifting assembly, taken on lines 7A—7A of FIG. 5.
Figure 7B:
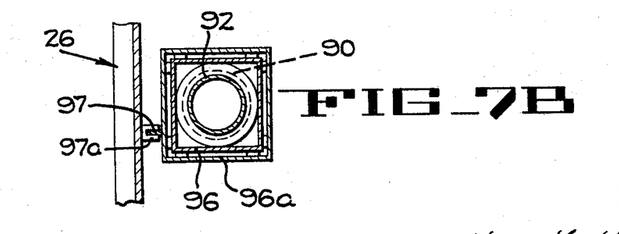
FIGURE 7B is a section taken on lines 7B—7B of FIG. 7A.

The platform 26 is raised and lowered under control of the operator by four ram assemblies which are hydraulically operated. Referring to FIGS. 7A and 7B, the ram assemblies include a cylinder 90 which is pivotally mounted at its lower end on the frame 70, and a telescoping piston 92, the upper end of which carries a lifting block 93 and a pulley 94. A chain 95 is anchored at one end to the frame 70, passes around the pulley 94 and is connected to the transporter platform 26 at each of the hydraulic rams. This is a conventional lift truck structure, the operation of which is well known in the art. In order to render each ram assembly laterally rigid, the cylinder 90 is supported laterally by a stiff tubular column 96 anchored to the frame 70. The lifting block 93 has depending therefrom a rigid tubular column 96a, which makes sliding engagement with the lower tubular column 96. Each corner of the platform 26 is guided on this column structure by means of a track 97 welded to the outer column 96a, and a guide shoe 97a fastened to the adjacent portion of the platform 26.

The platform 26 includes a plurality of power driven rollers 100, which are driven by a hydraulic motor. The details of the power drive are not critical to the present invention. As seen diagrammatically in FIG. 6 a hydraulic motor 102 drives a chain 104 which drives an idler sprocket 106 on a countershaft, a drive sprocket 108 on the same shaft drives a chain 110 which engages sprockets (not shown) on each of the power driven rollers 100 in accordance with conventional conveyor practice. The hydraulic motor 102 for the power driven platform rollers 100 is controlled remotely by switches 112, 112a at each end of the device and suitable solenoid valve circuits the details of which are not part of the present invention. Suitable hydraulic controls for the entire system are described in "The Fluid Power Book Issue" of Machine Design, December 1963, published by the Penton Publishing Co., Cleveland, Ohio.

A platform 114 extends along one side of the transporter and the operator is protected by guide rails 116 which mount the forward and reverse switch 86 for the transporter, and the forward and aft switches 112, 112a for the power rollers 100. Also mounted above the platform for access by the operator is an up-down control 118, for controlling the rams that raise and lower the transporter platform 26.

Stops 120, 120a are provided at each end of the platform 26. These stops are self clearing for cargo assemblies that enter the platform, but must be manually released by the operator in order to permit cargo assemblies to be driven off of either end of the platform. The details of the operation of these stops is not important, and a suitable device is shown in FIG. 7. A foot pedal 122 connects by means of a link 124 to a rod 126 which rotates a shaft 128 that carries the stop 120, or 120a. Each stop is spring raised by means of weights or a spring 130 (FIG. 7) connected to the frame of the platform.

It is necessary that the ram cylinder assemblies that raise and lower the platform be synchronized so that they move as a unit. The details of the synchronizing system are not critical to the present invention and suitable systems are described in the August 16, 1962, issue of Machine Design, pages 169 to 173, published by the Penton Publishing Co. of Cleveland, Ohio. Thus it can be seen that the transporter T can be moved along the tracks 24 between the dollies D, the staging units S and the loading assembly L, and the transporter platform can be raised and lowered for alignment with the platforms of the dollies, the staging units, and that of the loading assembly L. Furthermore, the rollers of the platform are power driven so that cargo assemblies C can be driven off of the platform 26 of the transporter, or can be carried onto it under control of a single operator standing on the catwalk 114 of the transporter platform 26. The transporter can travel at 200 feet per minute, and the power rollers can shift the pallets at 60 feet per minute.

Loading assembly

The function of the loading assembly L is to receive cargo assemblies from the transporter T, and carry them under power into the loading door of the aircraft. Other functions of the loading assembly are those of fore and aft motion for alignment with the doorsill of the aircraft, vertical motion for the same purpose, and yielding motion for accommodating yaw and pitch of the aircraft during loading, under the action influence of gusts of wind or the like.

The loading assembly L is illustrated in FIGS. 8–16. The loading assembly L is formed with lower laterally extending frame irons 132 (FIGS. 9 and 10) which connect to corner posts 134. By laterally extending, reference is made to the direction of motion of the cargo assemblies C on the loading assembly, the irons 132 being lateral to such motion. Actually the frame irons 132 extend longitudinally of the aircraft A, and in the direction of motion of the transporter T.

Figure 9:
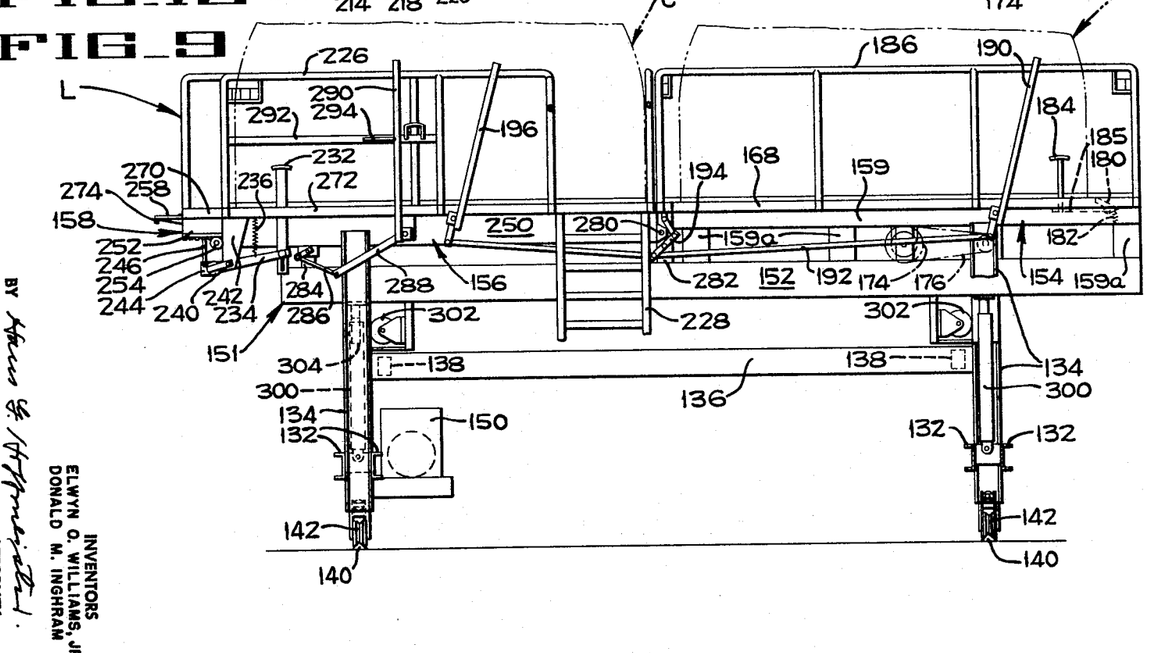
FIGURE 9 is a side view of the loading assembly, with the platform partially raised and with the bridge retracted, and with the bridge section of the power platform resting on its stabilizing blocks.
Figure 10:
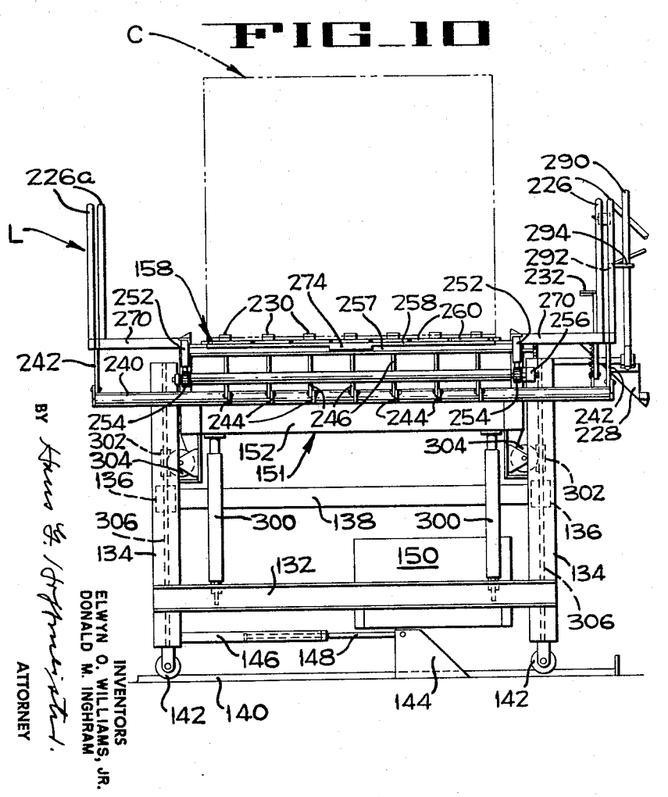
FIGURE 10 is an end view of the loading assembly, as seen from the aircraft.

As seen in FIG. 9, a pair of longitudinally extending frame members 136 are connected to the corner posts 134, and as seen in FIG. 10 another pair of laterally extending frame members 138 connect to the frame members 136.

The loading assembly L is mounted for limited motion along the fuselage of the aircraft, that is, in the direction of motion of the transporter T. To provide for this motion, relatively short tracks 140 are mounted on the floor and wheels 142 are mounted on each corner post 134 and are flanged to be guided along the tracks 140. The loading assembly L can be shifted along its tracks for alignment with the aircraft doorsill, so that pallets can be transported transversely between the transporter and the aircraft. To accomplish this shifting of the loading assembly spaced fixed brackets 144 are mounted on the floor, and a hydraulic cylinder 156 (FIG. 10) is mounted on the frame of the assembly, at each end thereof. A hydraulic piston 148 for each cylinder 146 is pivoted on the bracket 144. The cylinder and piston assemblies are double acting, and are provided with the usual connections and control valves for shifting the loading assembly back and forth over a distance of about 3 feet. Power for the shifting cylinder assembly and for the other hydraulic units on the motor assembly L to be described, is obtained from a power unit 150, which contains an electric motor and a suitable hydraulic pump or pumps, valves, piping and the like. As mentioned, the hydraulic circuits of this and other units of the invention represent nothing more than conventional engineering, do not form part of the invention, and hence are not described in detail.

The loading assembly L has mounted thereon a platform 151 which can be raised and lowered for alignment with the aircraft doorsill, and has a main frame 152. This platform carries a working or transfer platform for conducting pallets from the transporter T to the aircraft. The transfer platform itself is made up of three individually operable or separate units. These elements are a transfer section 154, which is located adjacent the transporter T; an intermediate conveyor section 156, which is located substantially adjacent the aircraft; and includes a bridge section 158 which can be projected and retracted to engage or clear the aircraft doorsill 18.

The loading assembly transporter section 154 includes a sub-frame 159, mounted on the main platform frame 152, by vertical members 159a. The transfer section 154 is provided with a plurality of power driven conveyor rollers 160 (FIG. 12), the end rollers 162 being somewhat larger in diameter than the intermediate rollers. The rollers are mounted in sub-frame 159. They are driven by a common chain 166 which passes over the upper portions of sprockets (not shown) on the intermediate rollers 160 around the sprockets on the end rollers 162, and around a pair of idlers 170 and a drive sprocket 172. The drive sprocket 172 is on a countershaft which carries another sprocket 174, driven by a chain 176 and a hydraulic motor 178.

In order to permit cargo assemblies to be driven on to the transfer conveyor section 154, but to prevent them from being driven off the conveyor unless an operator deliberately selects that operation, a self clearing stop 180 is provided at the transporter end of the loading assembly. This stop is urged by means such as a spring 182 (FIG. 9) to its raised position, and can be lowered by the transport operator by means of a pedal 184, and a lever 185, the details of this linkage are not critical to the invention. Two catwalks 168, 168a are provided with guard rails 186, 186a to protect the operator. An intermediate stop 188 (FIGS. 8 and 12) is provided. This stop is normally down but, can be manually raised by either the transport operator or the members of the crew that are loading the pallets into the aircraft. The transport operator can raise and lower the intermediate stop 188 by means of a lever 190 which operates through linkage 192 and a rocker lever 194 pivoted to the frame, for raising and lowering the stop 188. The screw at the plane can operate the intermediate stop 188 by means of a lever 196 and associated linkage. For example, if the crew at the aircraft on section 156 of the loading assembly L desires to prevent a pallet from being advanced to their zone they can raise the stop 188 through the lever 196. Conversely, the transporter operator can lower the stop with lever 190, but this is a deliberate act, causing him to check for safe conditions.

Figure 16:
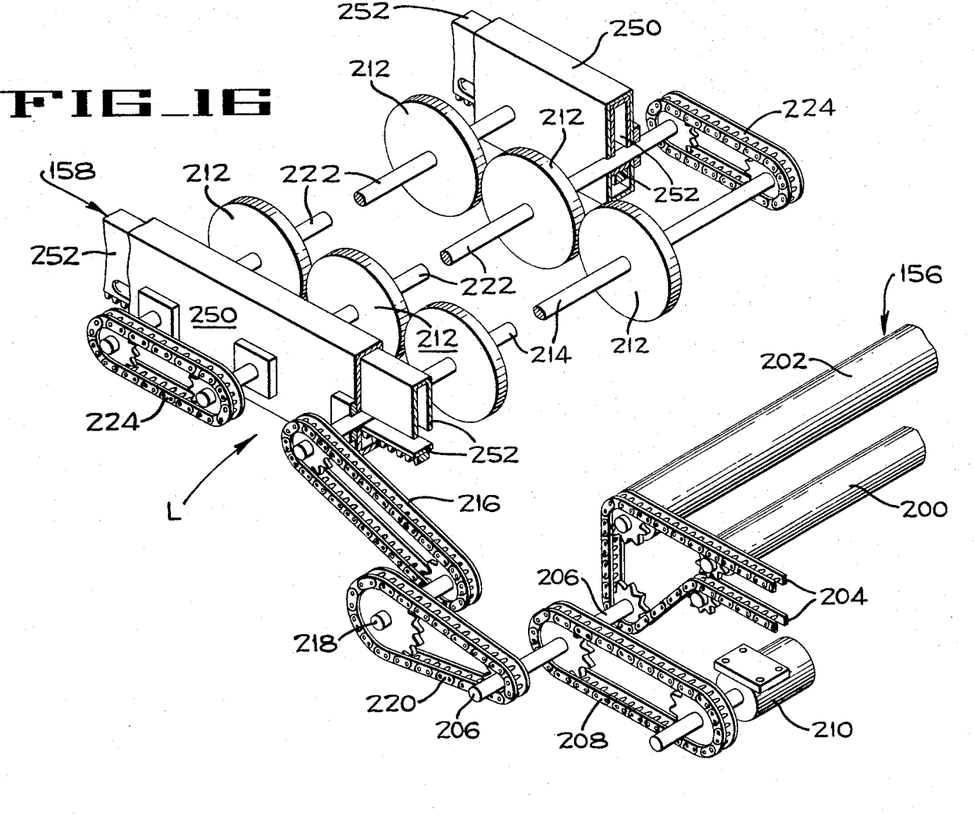
FIGURE 16 is a schematic perspective showing the power drive for the power rollers and wheels of the forward or aircraft section of the loading assembly conveyor.

The intermediate conveyor section 156 is differently designed because it incorporates the bridge section 158. The section 156 includes power driven rollers 200 and end rollers 202 (FIGS. 12 and 16) which are driven by a chain 204. The chain 204 is driven by a countershaft 206 which in turn is driven by a chain 208 and a hydraulic motor 210. The aircraft end of the intermediate conveyor section 156 is not provided with rollers, but rather with power driven wheels in order to make room for elements of the bridge section 158. As best seen in FIG. 16 these wheels 212 are mounted on shafts. The first shaft 214 is driven by a chain 216, a countershaft 218 and a chain 220, with the latter chain being driven from the countershaft 206 previously described. The other wheel shafts 222 are driven by chain and sprocket assemblies 224, as seen in FIG. 16. The section 156 of the loading assembly conveyors is protected by guard rails 226, 226a. A stepladder 228 is provided for access to the loader assembly platform.

Self clearing stops are also provided at the aircraft end of the loading assembly platform. These stops permit flat pallets to be pushed from the aricraft on to the loading assembly without interference, but must be manually depressed to permit pallets to leave the end of the intermediate conveyor section 156 of the loading assembly conveyor. These stops are operated by the crew at the aircraft, and they can therefore protect themselves against the transport operator's running pallets clear along the entire loading assembly, while the screw members are disposed in the path of the pallets. These stops include individual stop elements 230 (FIG. 8), mounted on a common shaft, and operated by a foot pedal 232 (FIG. 9) and a lever 234 connected to the stop shaft. The stops are urged into their raised position by a spring 236. The stop shaft, indicated at 240, is pivoted on the frame 242 (FIG. 9) and carries a plurality of plates 244 (FIGS. 9 and 10) for operating the individual stops 230. The plates 244 connect by means of links 246 (FIGS. 9, 10 and 12) to the stops 230, which are pivoted to the frame at 248. When the foot pedal 232 is depressed by a crew member at the aircraft, the stops 230 are pivoted rearwardly as indicated by the arrow in FIG. 12. They will now clear pallets being advanced toward the aircraft by the loading assembly conveyors.

As mentioned an extendable, retractable bridge section 158 is provided on the loading assembly adjacent the aircraft. The bridge section is mounted in a pair of fixed guide channels 250 (FIGS. 14 and 16) in which are slidably mounted racks 252. The guide channels 250 are actually part of the frame of the intermediate conveyor section 156, and as seen in FIG. 16 mount the wheel shafts 222 and 214 previously described.

Figure 14:
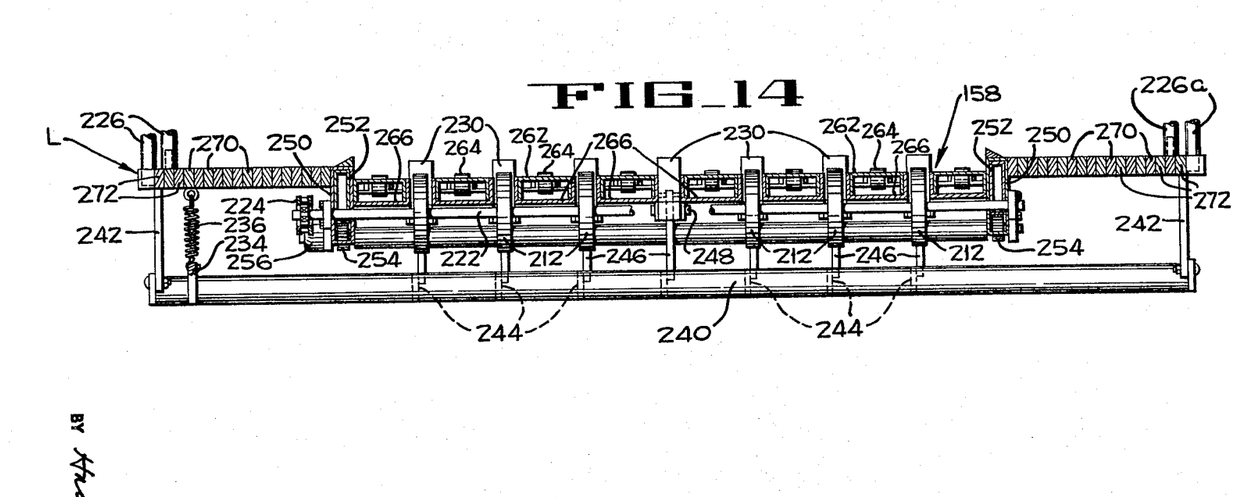
FIGURE 14 is a transverse section of the bridge, taken on lines 14—14 of FIG. 13 and showing bridge mounting details.

The racks 252 are advanced by pinions 254 (FIG. 14), on a common shaft, which shaft is driven by a hydraulic motor 256 (FIGS. 9 and 10) which motor may drive the shaft through a chain gearing reduction unit (not shown) or it may drive the shaft directly, as illustrated. The outer ends of the racks 252 are connected by a cross-bar 257 (FIG. 10) which mounts an upper cross-plate 258 (FIG. 11) carrying rollers 260. Extending rearwardly from the plate 258 are a plurality of bars 262 bearing rollers 264. The bars 262 are supported by a plurality of channel shaped members 266 (FIG. 14). The bridge section has a cat-walk in a form of spaced bars 270 (FIG. 11) projecting rearwardly from the front cross-plate 258, and which interfit with fixed bars 272 on the conveyor section 156. The front cross-plate 258 has a hook 274 attached thereto for resting on the doorsill 18 of the aircraft. The bridge section is shown retracted in FIG. 8 and extended in FIG. 11, with the hook 274 resting on the sill 18 of the aircraft A.

Figure 15:
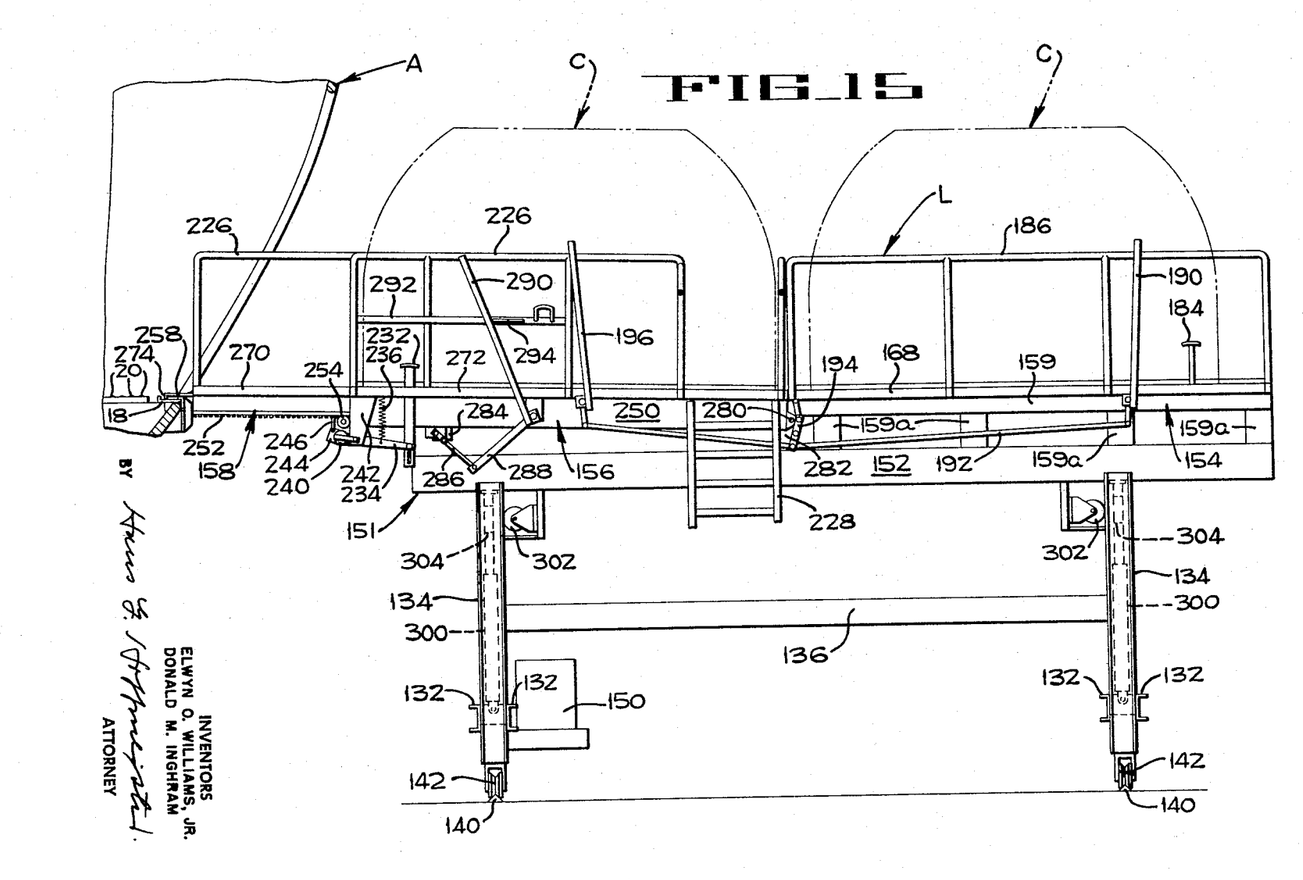
FIGURE 15 is a side view of the loading assembly with the platform lowered to cause the aircraft doorsill to support the bridge section of the platform.

In order to accommodate for motion of the plane, such as pitching or yawing, under the influence of wind or the like, the intermediate conveyor section 156, and the bridge section 158 which is carried thereby, is pivotally mounted on the loading assembly platform 151. This pivotal mounting is best seen in FIG. 9. The channels 250 that support the bridge racks 252 are pivotally mounted adjacent the transfer conveyor section 154 by means of pivots 280 mounted on blocks 282 supported on the platform frame members 152. Except during loading, the aircraft end of the bridge and intermediate conveyor section 156 are supported on retractable blocks 284 (FIG. 9) which are pivotally mounted on the channels 250 and engage the frame members 152. During loading these blocks are retracted by means of links 286, 288, and a lever 290. The bridge will now have been extended, and the bridge and the section 156 of the loading assembly will be supported by the aircraft doorsill, as shown in FIG. 15, with the blocks 284 pivoted clear as also is shown in the figure. A pivoted keeper bar 292 holds the lever so that the blocks are in their load bearing position as seen in FIG. 9. This bar 292 can be pivoted manually so that the detent 294 clears the lever, for positioning it to retract the blocks as seen in FIG. 15, whereupon the keeper bar 292 is returned to hold the lever 290 in its new position.

Means are provided to raise and lower the entire loading assembly platform. This is accomplished by four hydraulic rams 300, the cylinders of which are pivotally mounted on the frame adjacent each corner post 134, and the pistons of which are secured to the platform frame members 152. The platform is guided by wheels 302 mounted on the platform 152 (FIG. 9), which engage the corner posts 134. These wheels locate the platform in a fore and aft direction. The platform is guided laterally by a similar set of four wheels 304 (FIG. 10), which rest on the webs 306 of the H shaped corner posts 134. The platform has a vertical range of motion of 28 inches.

The control for the loading assembly L as illustrated diagrammatcially in FIG. 8, the actual wiring of the solenoid operated valves, switches and the like that control the various hydraulic motors in the pumps for the rams are engineering details that are not crucial to the invention and hence are not illustrated. Accessible to the operator of the transporter T is a start-stop switch 310 for the electric motor of the loading assembly. Also accessible is a reversing switch 312, which has a toggle for the transfer conveyor section 154, and one for the intermediate conveyor section 156 power rollers. Each toggle can be moved to run the rollers in either direction. Accessible to the crew members at the aircraft is a switch 312a, which also controls the power rollers of the conveyor sections 154 and 156. Next to this is a double acting switch 314 which controls the admission of fluid to the rams 300, for raising and lowering the platform. The switches 312a and 314 are actually mounted together on a portable switch box 316, which is connected by a flexible cable to the various controlled elements. This permits the crew at the aircraft to control the loading assembly from within the aircraft or at various positions at the aircraft end of the loading assembly. The loader can be moved fore and aft for alignment of the bridge with the doorsill of the aircraft by a switch 318, which is likewise a double acting switch. The bridge can be advanced in and out by a double acting switch 320, which controls the hydraulic motor 256 that turns the pinions for driving the racks on the bridge.

The rams 300 can be synchronized by hydraulic means such as those mentioned relative to the rams that lift the platform of the transporter T, these details not being critical to the invention.

*Operation*

The operation of the system of the present invention in loading an aircraft will now be explained briefly. As mentioned in the introduction to this specification, a loading plan will have been established before the aircraft is ready for loading, and in the present example numbers 1, 13 will have been assigned to the various cargo assemblies C. It will be assumed that the aircraft is empty.

Figure 13:
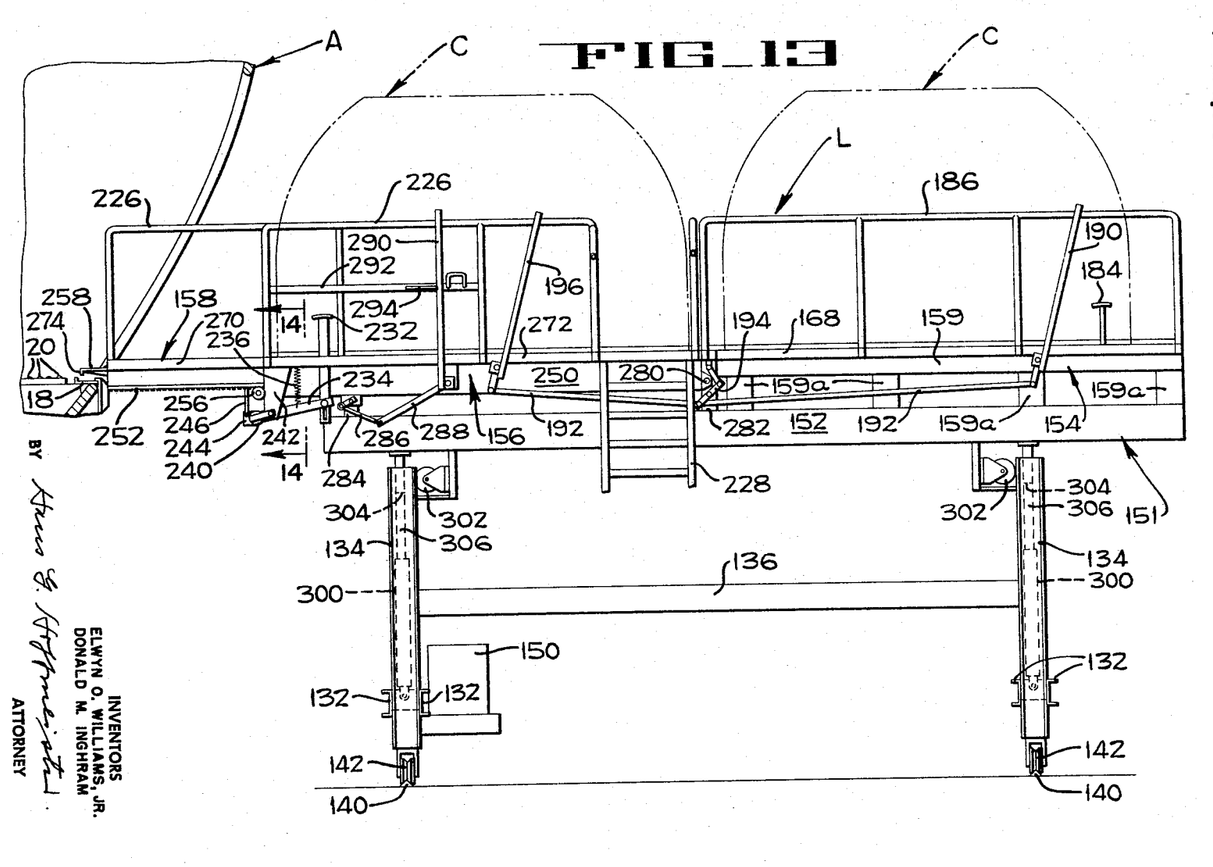
FIGURE 13 is a side view of the loading assembly, with the platform raised to clear the airplane doorsill, and with the bridge extended.

When the aircraft is parked adjacent the loading assembly L, the crew or helpers H at the aircraft open the door 16 and with the bridge 158 retracted operate the control switch 314 to bring the loading assembly platform substantially level with the doorsill of the aircraft. This control, as mentioned, controls the operation of the hydraulic rams 300. The switch 318 is then operated for controlling the loader positioning rams 146, to align the bridge with the sill of the aircraft. The platform is now precisely elevated so that the hook 274 (FIG. 13) is above the sill 18 of the aircraft. The control 320 (FIG. 8) is now operated to extend the bridge to the aircraft sill as seen in FIG. 13. The blocks 284 will be in their load bearing position at this time. The platform control 314 (FIG. 8) is now again operated to lower the platform and cause the hook 274 to support the bridge 158 and the conveyor section 156 directly on the aircraft sill. The other end of the bridge is supported on the pivots 280 at this time. This condition is illustrated in FIG. 15, and it will also be noted that the lever 290 has been operated to retract the blocks 284. The loader assembly is now ready for receiving pallets, and pitch and the yaw of the airplane will merely cause pivoting and warping of the bridge 158 and the intermediate conveyor section 156, without interfering with their opperation. This coupled with the pivoting action accommodates the loading assembly to pitching and yawing and other changes in position of the aircraft A.

Figure 5:
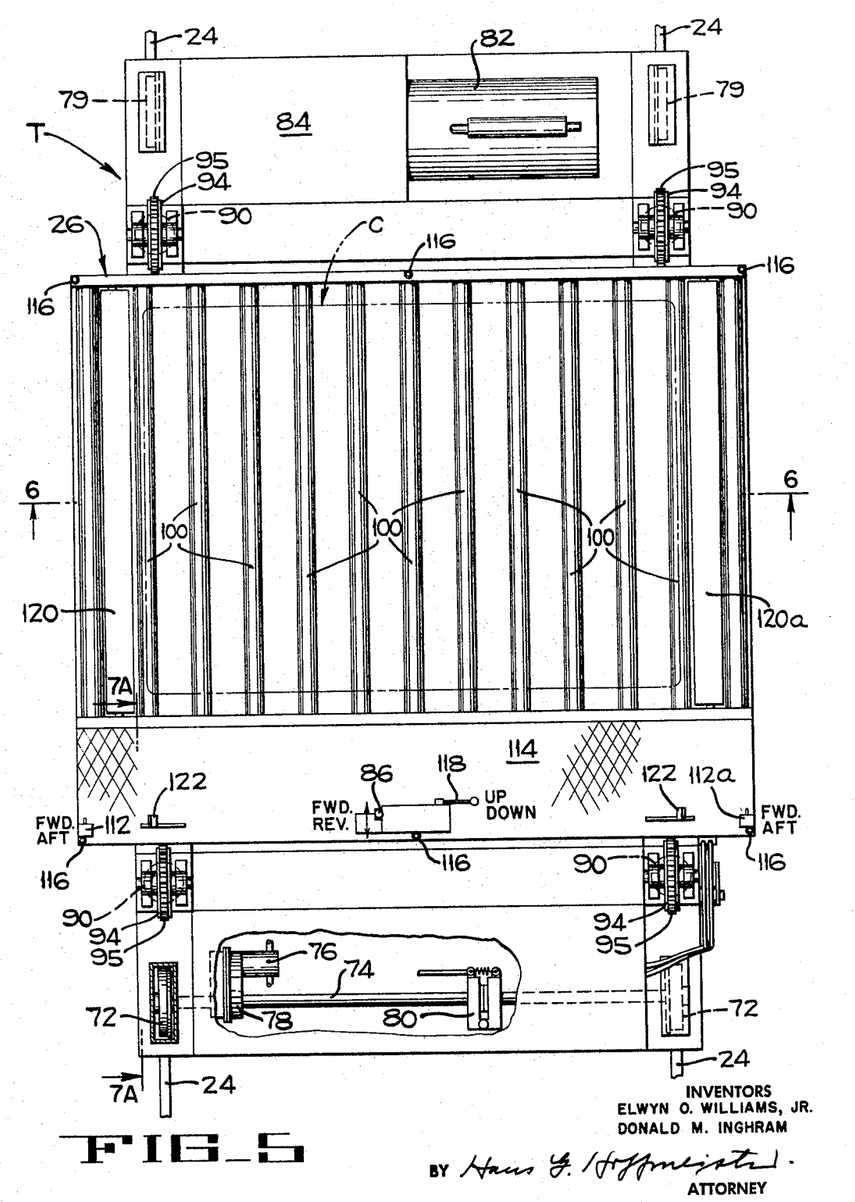
FIGURE 5 is a plan of the transporter.
Figure 6:
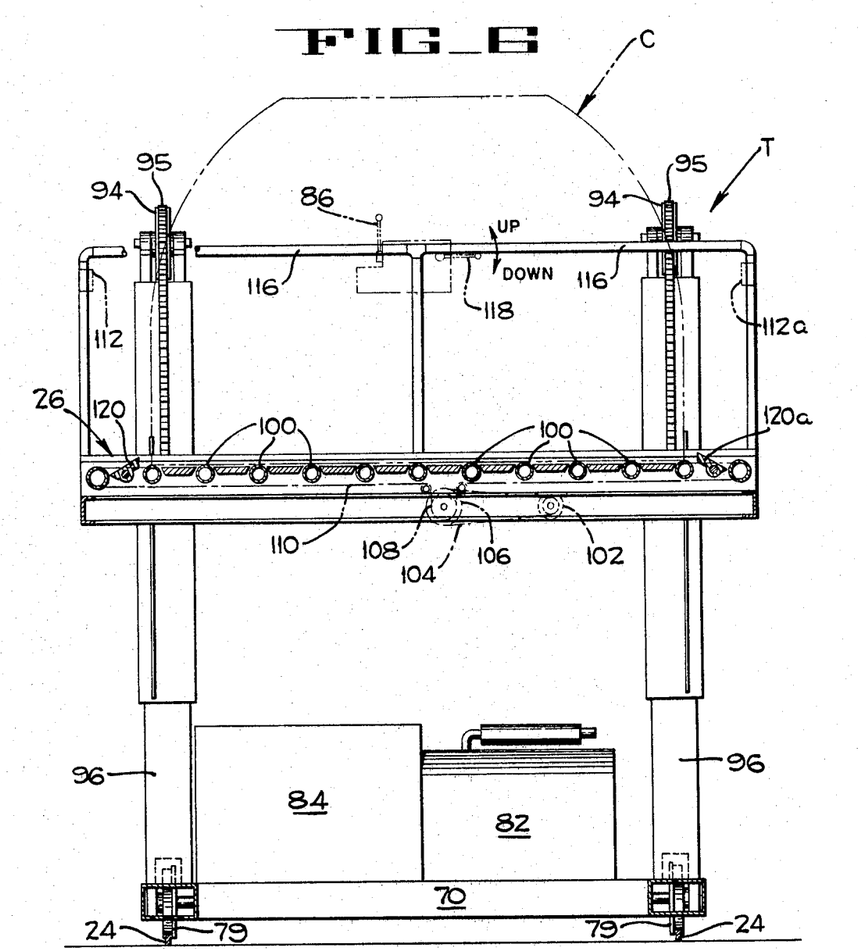
FIGURE 6 is a vertical section through the transporter taken on lines 6—6 of FIG. 5.

The principal operator O, who is on the transporter T (FIG. 1), will have been, during this time, picking up the pallet for loading zone No. 1 (FIG. 2). In terminal to plane loading, the pallets will usually be either on one of the terminal dollies D or in one of the stage units S. If it is on one of the dollies D, the operator O for the transporter T operates control 86 (FIG. 5) for causing the hydraulic drive motor 76 to position the transporter opposite the dolly. Control 118 is operated to control the pumping of hydraulic liquid to the elevating ram cylinders 90 (FIG. 7a) for lowering the transporter platform to the level of the dolly. Since the dolly rollers are not powered, a helper (not shown in FIG. 1) pushes the cargo assembly onto the platform of the transporter. After the pallet is partially on the platform, the power roller switch 112 or 112a is operated, to cause the hydraulic motor 102 (FIG. 6) to turn the conveyor rollers 100 in such a direction as to bring the pallet onto the transporter platform. The principal operator O for the transporter can now simultaneously elevate the platform by control 118, and cause the platform to move forward into alignment with the loader assembly L, by means of control 86 (FIG. 5).

When the transporter platform is aligned with the conveyor platform of the loader assembly L, the operator O causes the power rollers 100 of the transporter platform to move the pallet forward under control of switch 112 (FIG. 5), having lowered the stop 120. He has also access to switch 312 (FIG. 8) on the loading assembly, for causing the power rollers 160 of the transfer conveyor section 154 to pick up the pallet and continue its motion. If the central stop 188 is down, he can also control the power rollers 200 of the intermediate conveyor section 156 and the wheels 212 of that section to bring the pallet to the aircraft. The stop 180 of the loading assembly at the transporter section is self clearing as mentioned. However the stops 230 may be in a raised position, in which case the cargo cannot advance further. If the stops 230 are lowered, the intermediate conveyor section 156 of the loading assembly can cause the pallet to cross the bridge section 158 to partially enter the aircraft door. Here the helpers H (FIG. 1) push the pallet completely into the aircraft over the balls 20 at loading zone 2 (FIG. 2). The aircraft crew now pushes the pallet No. 1 along the cargo deck over rollers 22 up to its position in the nose section of the aircraft fuselage. In the meantime, the principal operator O for the transporter T will be picking up a pallet for loading zone 13 (FIG. 2) of the aircraft. This operation will continue until loading zones 12 to 3 of the aircraft are filled. The pallet for loading zone 2 will be the last one to be placed into the aircraft. The loading assembly platform is now elevated, the bridge retracted, and the aircraft can be prepared for take-off.

The unloading procedure will be obvious from the above description. However, it is contemplated that in case of plane to plane loading, the pallets may or may not be placed in the terminal but may be unloaded directly on to one or more of the exterior dollies D1 (FIG. 1), for later pick-up and transfer to another plane by the transporter T and the loading assembly L.

Thus it can be seen a single principal operator O (FIG. 1) operates most of the power equipment of the system of the present invention. The loading crew at the aircraft such as helpers H (FIG. 1) operate the loading assembly but their principal function is that of stowing the cargo pallets in aircraft fuselage. Although helpers are necessary to initially push cargo pallets off of the dollies D onto the transporter platform no helpers are necessary for cargos stored in the staging units S. These units contain power rollers, and control switches 62, 64 for the two tiers (FIG. 4) are accessible to the transporter operator O.

Figure 11:
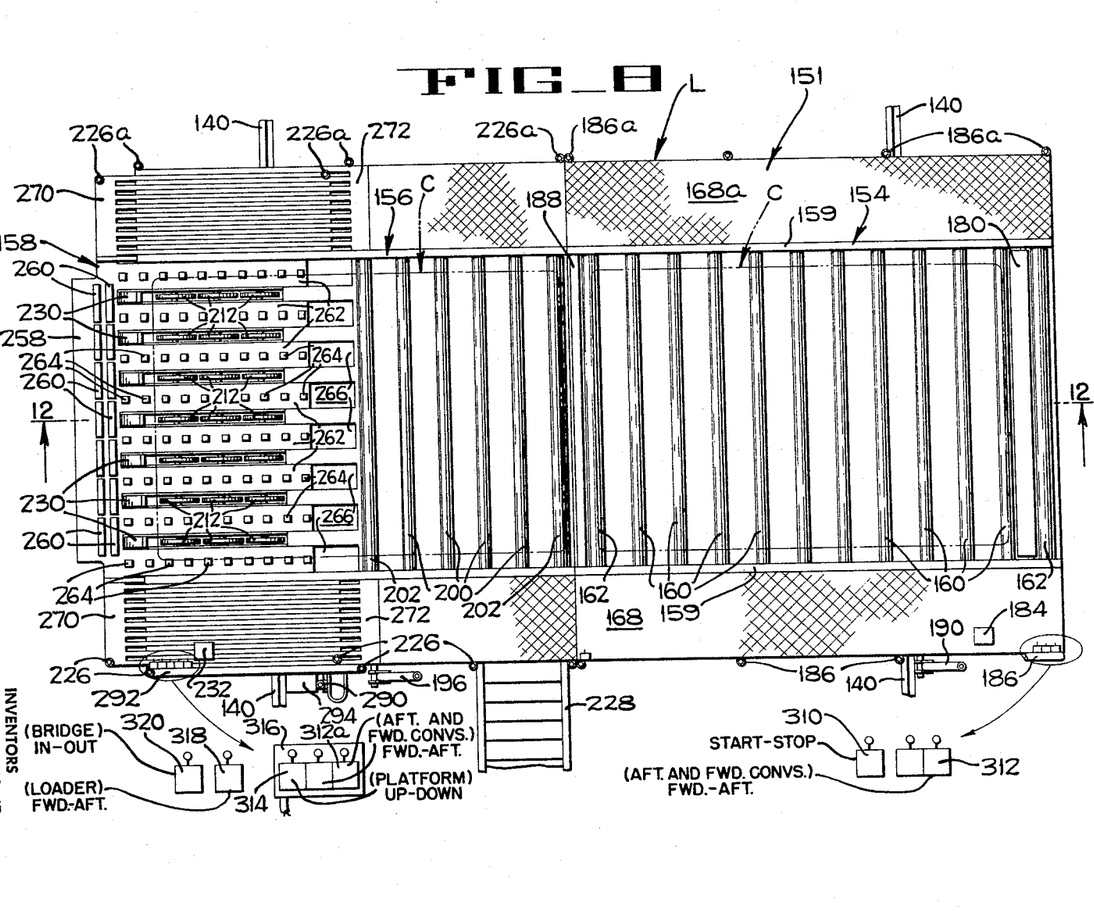
FIGURE 11 is a plan of the bridge end of the loading assembly, with the bridge extended, and resting on the aircraft doorsill.
Figure 12:
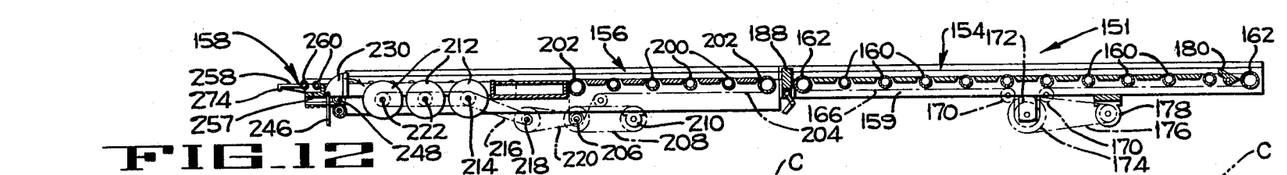
FIGURE 12 is a longitudinal section taken on lines 12—12 of FIG. 8.

In practice it is to be found the aircraft of the type referred to can be loaded with thirteen cargo assemblies weighing up to five tons each in a time as short as 20 minutes. The only experienced operator is the principal operator O on the transporter. The helpers H at the aircraft need only understand operation of the loading assembly L for alignment thereof with the aircraft. The loading assembly L provides protection to the helpers when they are in the plane, against the operator O advancing a pallet into the plane. The protection is afforded by the stops 230 (FIG. 11). The stops 180 on the transporter end of the loading assembly (FIG. 8) prevents running a pallet off of the loading assembly, unless the stop 180 is manually lowered by the transporter operator, with the transporter in position to receive pallets. Similarly the stops 120, 120a (FIG. 6) on the transporter platform prevent inadvertent running of the cargo pallet off of the transporter platform by the principal operator O when the transporter is not ready for unloading. The transporter operator must deliberately depress these stops before the pallet can clear the transporter platform in either direction.

Having completed detailed descriptions of the invention so that those skilled in the art may practice the same we claim:

1. A system for the terminal loading and unloading of cargo pallets in a cargo aircraft of the type having a cargo deck, a cargo door, and a doorsill; said system including a transporter, reversible power means for moving said transporter in a path along the floor of the terminal, a pallet carrying transfer platform on said transporter, power means for raising and lowering said transfer platform, said transfer platform having reversible power driven pallet conveying means for moving pallets in either direction transversely to the path of motion of said transporter on the floor; a loading assembly for transferring pallets between said transporter and the aircraft, said loading assembly comprising a loading platform extending transversely between the path of said transporter and the sill of the aircraft, power means for raising and lowering said loading platform to level it with the aircraft sill, and reversible power driven pallet conveying means on said loading assembly platform.

2. The system of claim 1, including means for shifting said loading assembly along the terminal floor in the direction of motion of said transporter for aligning the loading platform longitudinally with the aircraft doorsill.

3. The system of claim 1, wherein the loading platform of said loading assembly includes an extensible, retractable cantilever bridge section, and a lip on the free end of said bridge section for support by the doorsill of the aircraft.

4. The system of claim 3, wherein retractable stabilizing supports are provided between the free end of said pivoted aircraft section and the platform.

5. The system of claim 3, wherein the power driven conveying means on each section of said transfer assembly are independently driven and controllable.

6. A system for the terminal loading and unloading of cargo pallets in a cargo aircraft of the type having a cargo deck, a cargo door, and a doorsill; said system including a transporter, reversible power means for moving said transporter in a path along the floor of the terminal, a pallet carrying transfer platform on said transporter, power means for raising and lowering said transfer platform, said platform having reversible power driven pallet conveying means for moving pallets in either direction; a loading assembly for transferring pallets between said transporter and the aircraft, said loading assembly comprising a loading platform extending transversely of the aircraft cargo deck, power means for raising and lowering said loading platform to level it with the aircraft sill, said loading platform comprising a transfer section for receiving pallets from the transporter, and an intermediate section for loading the aircraft, each of which is at least as long as a pallet, the intermediate section being pivoted to the platform adjacent the transfer section and having a lip for disposition at the aircraft doorsill, and reversible power driven pallet conveying means on each section of said loading assembly loading platform.

7. The system of claim 6, wherein the intermediate section of the loading platform of said loading assembly includes an extendible, retractable cantilever bridge section, and with said lip being on the free end of said bridge section.

8. A system for the terminal loading and unloading of cargo pallets in a cargo aircraft of the type having a cargo deck, a cargo door, and a doorsill; said system including a transporter, reversible power means for moving said transporter in a path along the floor of the terminal, a pallet carrying transfer platform on said transporter, power means for raising and lowering said transfer platform, said platform having reversible power driven pallet conveying means for moving pallets in either direction transversely to the path of motion of said transporter on the floor; a plurality of staging units on the terminal floor, each staging unit including a pallet receiving platform having reversible power driven conveying means, said staging units lying along the path of said transporter; a loading assembly for transferring pallets between said transporter platform and the aircraft, said loading assembly comprising a loading platform extending transversely between the path of said transporter and the sill of the aircraft, power means for raising and lowering said loading platform to level it with the aircraft doorsill, and reversible power driven pallet conveying means on said loading assembly platform.

9. A system for the terminal loading and unloading of cargo pallets in a cargo aircraft of the type having a longitudinally extending cargo deck, a cargo door, and a doorsill; said system including a transporter, reversible power means for moving said transporter in a path along the floor of the terminal, a pallet carrying transfer platform on said transporter, power means for raising and lowering said transfer platform, said platform having reversible power driven pallet conveying means for moving pallets in either direction transversely to the path of motion of said transporter on the floor, pallet stops at each end of said platform, said stops being self clearing for pallets entering the platform, and operator controlled means for retracting said stops for unloading the platform; a loading assembly for transferring pallets between said transporter platform and the aircraft, said loading assembly comprising a loading platform extending transversely between the path of said transporter and the doorsill of the aircraft, power means for raising and lowering said loading assembly platform to level it with the aircraft doorsill, and reversible power driven pallet conveying means on said loading assembly platform.

10. The system of claim 9, wherein pallet stops are provided at each end of said loading assembly platform, said stops being self clearing for pallets entering the platform, and operator controlled means at the stops for retracting said stops for unloading the loading assembly platform.

11. For use in a system for the terminal loading and unloading of cargo pallets in a cargo aircraft of the type having a longitudinally extending cargo deck, a cargo door, and a doorsill, said system including a pallet transporter for transporting pallets adjacent to the aircraft; a loading assembly comprising a frame, a loading platform on said frame for extending between the path of the transporter and the sill of the aircraft, power means for raising and lowering said loading platform frame to level the loading platform with the aircraft doorsill, said loading assembly platform comprising a transfer section at the transporter, and an intermediate section for loading the aircraft, each section being at least as long as a pallet, the intermediate section being pivotally supported on the platform frame adjacent the transfer section, said intermediate section having a mounting lip for presentation to the aircraft doorsill, and reversible power driven pallet conveying means on each section of said transfer assembly loading platform.

12. The loading assembly of claim 11, wherein the intermediate section of the loading platform of said loading assembly includes an extendible, retractable cantilever bridge section, and said lip is on the free end of said bridge section.

13. The loading assembly of claim 12, including means for shifting said loading assembly along the terminal floor transversely of the direction of motion of said conveying means for aligning the loading platform with the aircraft doorsill. , 14. The loading assembly of claim 12, wherein retractable stabilizing supports are provided between the free end of said pivoted aircraft section and the loading platform frame.

15. The system of claim 6, wherein said loading assembly lip rests upon and is supported solely by the aircraft doorsill.

16. The loading assembly of claim 12, wherein said bridge section lip is provided with means for supporting the free end of the bridge section directly on the aircraft doorsill.

17. A system for the terminal loading and unloading of cargo pallets in a cargo aircraft of the type having a cargo deck, a cargo door, and a doorsill; said system including a transporter, reversible power means for moving said transporter in a path along the floor of the terminal, a pallet carrying transfer platform on said transporter, said transfer platform having reversible power driven pallet conveying means for moving pallets in either direction toward or away from the aircraft doorsill; a loading assembly for transferring pallets between said transporter and the aircraft, said loading assembly comprising a loading platform extending between said transporter and the doorsill of the aircraft when the transporter has been moved toward the aircraft adjacent to said loading assembly, power means for raising and lowering said loading assembly loading platform to level the aircraft end of the platform with the aircraft doorsill, and reversible power driven pallet conveying means on said loading assembly loading platform.

18. A system for the terminal loading and unloading of cargo pallets in a cargo aircraft of the type having a cargo deck, a cargo door, and a doorsill; said system including a transporter and a loading assembly, said loading assembly including a loading platform, one end of said loading assembly loading platform being adjacent the aircraft doorsill, power means for raising and lowering said loading platform to level said one end thereof with the aircraft doorsill, reversible power driven pallet conveying means on said loading assembly platform; reversible power means for moving said transporter in a path along the floor of the terminal toward and away from the other end of said loading assembly, a pallet carrying transfer platform on said transporter, and reversible power driven pallet conveying means on said transporter transfer platform for moving pallets in either direction toward and away from said other end of said loading assembly for transferring pallets between said transporter and the loading assembly.

19. The system of claim 18, wherein power means are provided for raising and lowering said transporter transfer platform.

References Cited by the Examiner
UNITED STATES PATENTS 3,026,071 3/1962 Barcellona et al. ___ 214—38 XR
3,136,433 6/1964 Ingbram ___________ 214—38

GERALD M. FORLENZA, *Primary Examiner.*

R. G. SHERIDAN, *Assistant Examiner.*